US007343242B2

(12) United States Patent
Breitenberger et al.

(10) Patent No.: US 7,343,242 B2
(45) Date of Patent: Mar. 11, 2008

(54) TRAFFIC STATUS DETECTION WITH A THRESHOLD METHOD

(75) Inventors: Susanne Breitenberger, Munich (DE); Martin Hauschild, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/453,924

(22) Filed: Jun. 16, 2006

(65) Prior Publication Data

US 2006/0287808 A1 Dec. 21, 2006

Related U.S. Application Data

(63) Continuation of application No. PCT/EP03/14646, filed on Dec. 19, 2003.

(51) Int. Cl.
*G08G 1/01* (2006.01)
*G01C 21/26* (2006.01)
*G06F 19/00* (2006.01)

(52) U.S. Cl. ....................... 701/117; 701/208; 701/211; 340/905; 340/995.13; 455/456.3

(58) Field of Classification Search ................ 701/117, 701/118, 119, 202, 208, 211; 340/904, 905, 340/995.13; 455/414.2, 414.3, 456.3
See application file for complete search history.

(56) References Cited

U.S. PATENT DOCUMENTS

| | | | | |
|---|---|---|---|---|
| 5,428,545 A * | 6/1995 | Maegawa et al. | ........... | 701/210 |
| 6,061,625 A * | 5/2000 | Fastenrath | .................. | 701/117 |
| 6,092,020 A * | 7/2000 | Fastenrath et al. | .......... | 701/119 |
| 6,131,064 A * | 10/2000 | Vieweg | ...................... | 701/117 |
| 6,178,374 B1 | 1/2001 | Moehlenkamp et al. | | |
| 6,650,252 B2 * | 11/2003 | Miller, Jr. | ................... | 340/989 |
| 2002/0045985 A1 * | 4/2002 | Kerner | ....................... | 701/117 |
| 2003/0187570 A1 * | 10/2003 | Impson et al. | .............. | 701/117 |
| 2006/0089787 A1 * | 4/2006 | Burr et al. | .................. | 701/202 |

FOREIGN PATENT DOCUMENTS

| | | |
|---|---|---|
| DE | 19917154 A1 | 10/2000 |
| DE | 10215887 A1 | 10/2003 |
| EP | 0715286 | 6/1996 |
| EP | 1262934 | 12/2002 |

OTHER PUBLICATIONS

International Search Report for PCT/EP2003/014646 dated Aug. 12, 2004.

* cited by examiner

*Primary Examiner*—Tan Q. Nguyen
(74) *Attorney, Agent, or Firm*—Crowell & Moring LLP

(57) ABSTRACT

A method for providing traffic status information as part of a traffic status detection system using a traffic status detection device provided in the vehicle, in particular traffic status information for ascertaining the traffic situation, including traffic status information for detecting congested traffic is provided. To provide high-quality traffic status information at an acceptable cost, it is proposed that in a first step a traffic status is detected repeatedly by the traffic status detection device. In a second step, a change in traffic status is detected by the traffic status detection device. In a third step, a data record describing the change in traffic status is generated by the traffic status detection device, in particular a program-controlled computer, and in a fourth step, the data record is transmitted from the traffic status detection device to a receiver that receives the data record, via Short Message Service.

18 Claims, 6 Drawing Sheets

TRAFFIC STATUS DETECTION WITH A THRESHOLD METHOD

CROSS REFERENCE TO RELATED APPLICATIONS

This application is a continuation of PCT International Application No. PCT/EP2003/014646, filed on Dec. 19, 2003 the entire disclosure of which is herein expressly incorporated by reference. This application contains subject matter which is related to the subject matter contained in application Ser. No. 11/453,921, filed on even date herewith, entitled "Verifying the Validity of Traffic Status Information" by Susanne Breitenberger and Martin Hauschild, the entire disclosure of which is herein expressly incorporated by reference.

BACKGROUND AND SUMMARY OF THE INVENTION

The invention relates to a method for providing traffic status information, a system for transmitting traffic status information, a device in a vehicle for generating and sending traffic status information and a computer program product for use in a motor vehicle and for generating and sending traffic status information.

Known vehicles send so-called "floating car data" (FCD). The system used for this purpose consists of a GPS receiver and a GSM module. Both modules are already present in many vehicles even without FCD functionality. The GPS receiver measures the position and the FCD methods determine the travel times of the vehicle from a multitude of such position data. These travel times are sent like a string of beads (individual points on the trip route with position coordinates and equipped with a time stamp) to central traffic information offices via a GSM network. These offices can draw inferences regarding the traffic situation from these travel times. This allows data acquisition of traffic status information for traffic information services.

Data transmission via the GSM network is associated with a high cost.

In the future, FCD will be developed into XFCD (extended floating car data) to make the acquisition of traffic position data more accurate and also to provide information about the weather, road condition and local hazards. XFCD uses the various sensors and subsystems present in the vehicle, which are already making their data available on central data buses in the vehicle. Analysis of the various data en route can provide information about traffic conditions, impaired visual conditions, road conditions (roadway surfaces), infrastructural conditions (winding roads), local hazards, rainfall, slippery road conditions and skidding hazards.

The object of this invention is in particular a method for providing high quality traffic status information at an acceptable cost.

An aspect of the inventive method for providing traffic status information as part of the traffic status detection by a traffic status detection device provided in the motor vehicle consists of performing the following steps. According to this invention, the traffic status information is used in particular for detecting traffic situations, such as for detecting congested traffic. In a first step, a traffic status is detected repeatedly by the traffic status detection device, and in a second step, a change in traffic status is ascertained, i.e., detected, by the traffic status detection device. In a third step, a data record describing the change in traffic status is generated by the traffic status detection device, in particular a program-controlled computer, and finally in a fourth step, the data record is transmitted from the traffic status detection device to a receiver that receives the data record. This may be accomplished via Short Message Service (SMS), for example.

Through this method, in particular for providing traffic status information for the acquisition of traffic situations in the entire highway network, it is possible to largely reliably detect a traffic event and/or a change in traffic status such as a change from a "driving freely" traffic status to a "congested" traffic status and to transmit the traffic event as a given condition only when it in fact occurs, i.e., the inventive method permits an event-oriented generation of traffic status information. Traffic status information is transmitted only when prompted by the traffic status detected, e.g., congested traffic. Event-oriented data transmission to an institution that reconstructs and reports the traffic situation, in particular a central traffic information office, is currently performed via SMS, but this limits the data transmission required to display the traffic situation to a minimum. This means considerable cost savings without impairing the quality of the traffic situation detection.

Instead, the inventive method for the first time permits an inexpensive and nevertheless almost real time data acquisition for the entire roadway system, in particular on highways, country roads and city roads.

In one embodiment of the present invention, the data record indicates whether a change in traffic status from the traffic of "congestion" to the traffic status "driving freely" (510) or a change in traffic status from the traffic status of "driving freely" to the traffic status of "congestion" has been detected by the traffic status detection device provided in the motor vehicle.

Alternatively or additionally, in one embodiment of this invention, in ascertaining the traffic states of "congestion" or "driving freely" a check is performed several times to determine whether the relevant speed of the vehicle is less than a lower speed threshold and greater than an upper speed threshold.

Alternatively or additionally, in another embodiment of this invention, the check is performed periodically and the traffic status of "congestion" or "driving freely" considered as prevailing is the state that has been occurring largely without interruption and was the first to do so with a predetermined frequency.

Through the continuous detection of the two states and not only a single state, it is possible to detect reliably whether there is congested traffic and also to detect reliably whether uncongested continuation of driving is possible again. This avoids rapid and unreliable switching back and forth between the two states of "congestion" and "driving freely" on the basis of merely short-term changes in the traffic situation.

Alternatively or additionally, in another embodiment of this invention the data record describing the change in traffic status also indicates the place and time of the change in traffic status, in particular the beginning or end of the congested traffic.

Through the measures mentioned above, a precise and current determination of the traffic situation is made possible, such as a detection of congestion. Unnecessary detours because of congested traffic which is merely presumed to exist can thus be avoided throughout the entire traffic network—and not only on the highways.

Alternatively or additionally, in one embodiment of the invention, after transmission of the data record of the change in traffic status after a predetermined interval of time and/or distance, a second data record describing the traffic status, in particular the congested traffic, is transmitted by the vehicle. This second data record indicates in particular the average speed in the congested traffic and/or frequency of stopping in the preceding interval.

This measure makes it possible to automatically provide an updated traffic situation report after an initial change in traffic status and before a second change in traffic status. Furthermore, the second data record allows a more precise determination of the change in traffic status in time or space.

Alternatively or additionally, in one embodiment of the invention, the receiver is a central traffic information office, which may be a regional central traffic information office which supplies a traffic situation report using the data record.

Alternatively or additionally, in one embodiment of the invention, the traffic situation is made available using the data record and other traffic status information, in particular information from local measurement points such as induction loops, bridge sensors, camera systems, signal lights or mobile measurement sites, such as reporting vehicles, traffic jam reporters or police reports. This linking of traffic status information from different sources permits a precise determination of the traffic situation which largely covers the area. In the case of regional central traffic information offices, they are better able to take into account regional requirements than would be possible with a single central office.

Alternatively or additionally, in one embodiment of the invention, the receiver is at least one other vehicle that analyzes the data record to support the driver and/or relays the data record to other vehicles and/or to central traffic information offices via data collecting points, in particular relaying the information to a transmission network via a wireless interface. This measure makes it possible for vehicles to mutually transmit relevant traffic status information, optionally including a central traffic information office, in particular for determining the traffic situation.

The inventive method for acquiring data also permits an advantageous system for transmitting traffic status information from a first vehicle to a second vehicle, in particular via an ad hoc network or from a central traffic information office to one or more vehicles, optionally modified, in particular by broadcast. It is likewise possible for an advantageous device and a computer program product to be used in a motor vehicle for generating and transmitting traffic status information.

Other objects, advantages and novel features of the present invention will become apparent from the following detailed description of the invention when considered in conjunction with the accompanying drawings.

DETAILED DESCRIPTION OF THE DRAWINGS

This invention is explained in greater detail below on the basis of diagrams from a sequence control.

Vehicle-generated data is supplied to a computer algorithm by the vehicle data buses via known standard sensor interface, which may be once every second. Specifically, this data includes:

position coordinates from navigation system
road category from navigation system
distance from nearest intersection from navigation system
distance from end of road segment traveled from navigation system
average normal speed from navigation system
inner city/outside of city (type of road) from navigation system
speed from vehicle bus
steering angle from vehicle bus
gear from vehicle bus
hazard light, flasher from vehicle bus
ABS from vehicle bus
DSC/ASC from vehicle bus
crash sensor from vehicle bus
airbag from vehicle bus
door status from vehicle bus
nearest type of POI from navigation system
distance from POI from navigation system
temperature from vehicle bus
lights from vehicle bus
fog lights from vehicle bus
wiper setting from vehicle bus
wiper frequency from vehicle bus
parking brake from vehicle bus POI stands for "points of interest" such as restaurants, gas stations, hospital, etc.

Figure 1:
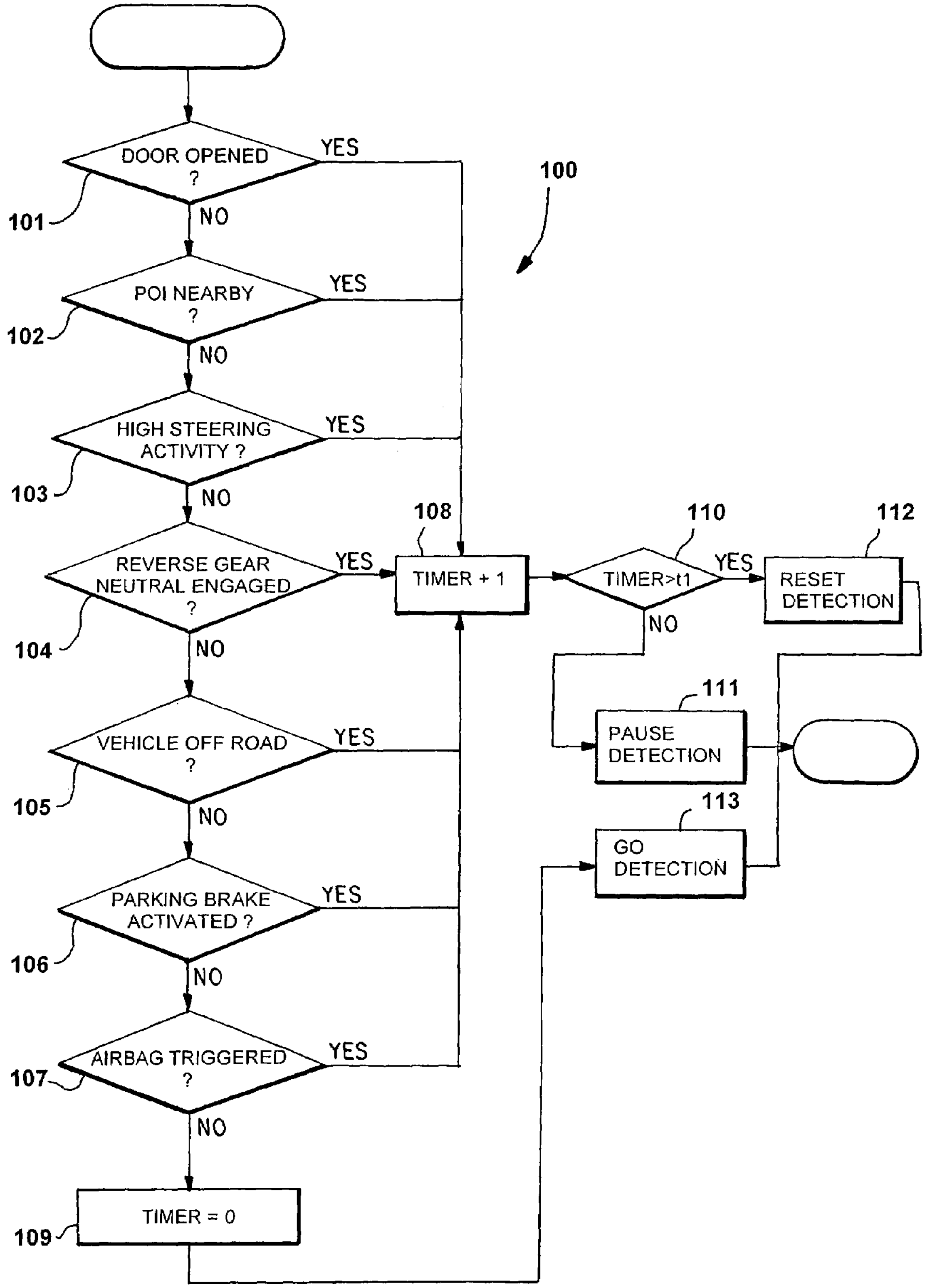
FIG. 1 illustrates a flow chart of a software module for determining the scope of the traffic status detected.

To check on the scope of validity according to FIG. 1, a decision about whether the vehicle is currently participating in moving traffic is made on the basis of the following information:

position coordinates
road category
inner city/outside of city (type of road)
gear choice
door status
nearest type of POI
distance from nearest POI
steering maneuver
parking brake
airbag
crash sensor The status of the vehicle doors and the current gear selection provide information, for example, regarding whether people are getting into or out of the vehicle (door being opened).

Parking maneuvers can be detected by analyzing the steering angles in conjunction with the speed. Data from the digital map provides information about whether the vehicle is driving on a public road or is in a large parking lot or a rest stop or a gas station, for example.

The flow chart of the software module 100 for determining the scope of the traffic status detected uses the following comparisons which are performed in order to find an indication that the vehicle is not traveling in road traffic in the usual manner. The comparison 101 verifies whether the door is open; the comparison 102 verifies whether a POI (point of interest) is nearby; the comparison 103 verifies whether there is a high steering activity; the comparison 104 verifies whether reverse gear or neutral gear of the vehicle has been engaged; the comparison 105 verifies whether the vehicle is driving off-road based on the data supplied by the navigation system (not shown here); the comparison 106 verifies whether the parking brake has been activated; the comparison 107 verifies whether the airbag has been deployed. If the result of one or more of these comparisons is positive and/or if the answer to one of the comparisons 101 through 107 is "yes," this is interpreted as an indication that the vehicle is either moving or standing still in a situation which should not be taken into account in detection of a status and/or in detection of "driving freely" and/or "go."

If the result of one or more of the comparisons 101 through 107 is positive (e.g., a comparison may be done once every second), a counter 108 is incremented by "1." For example, if the door is opened, the comparison 101 results in a first "yes" and the counter is set at "1." In the next second, a new comparison 101 is performed and the counter is set at "2" if the door is open, etc. If the door is closed the result is "no," and the comparison 102 is performed in the next second. If the result is "yes," the counter is incremented by "1" to "3." If there is no positive comparison after running through all the comparisons 101 through 107, the counter reading on the counter is reset at "0." Each positive comparison thus increments the counter reading on the counter 108, although only until the system has run through all the comparisons 101 through 107, with the result of all comparisons being "no." If necessary, the counter 101 is set at "0," as indicated in 109.

The value t1 in a comparison 110 is set at "60" in this exemplary embodiment. If the counter reading on the counter 108 does not reach the counter reading "60," then the result of the comparison 110 is "no" and the detection of whether there is congested traffic is suspended, as indicated by the "PAUSE detection" 111. If the result of the comparison 110 is "yes," i.e., if one of the states of the comparisons 101 through 107 lasts for more than 60 seconds, a reset of the detection of whether or not there is congested traffic is performed. This is indicated by the "RESET detection" 112. How the "RESET detection" is performed and what it triggers will be explained below in greater detail in conjunction with FIGS. 5A and 5B. If the result of the comparisons 101 through 107 has always been "no," then this is considered to be a situation in which there is no exceptional state and the detection of congested traffic is performed as described in greater detail below. This is indicated by "GO detection" 113.

It is also advantageous to perform the comparisons 101 through 107 continuously in order, instead of performing all comparisons in parallel (not shown here), because when the result of at least one comparison is positive, subsequent comparisons need not be performed, thus allowing savings in computation time and/or hardware resources. Likewise, the comparisons 101 through 107 may also be run through in any other order. For example, the inquiry 106 as to whether the parking brake has been activated may be made prior to the query 101 as to whether a door is open.

Figure 2:
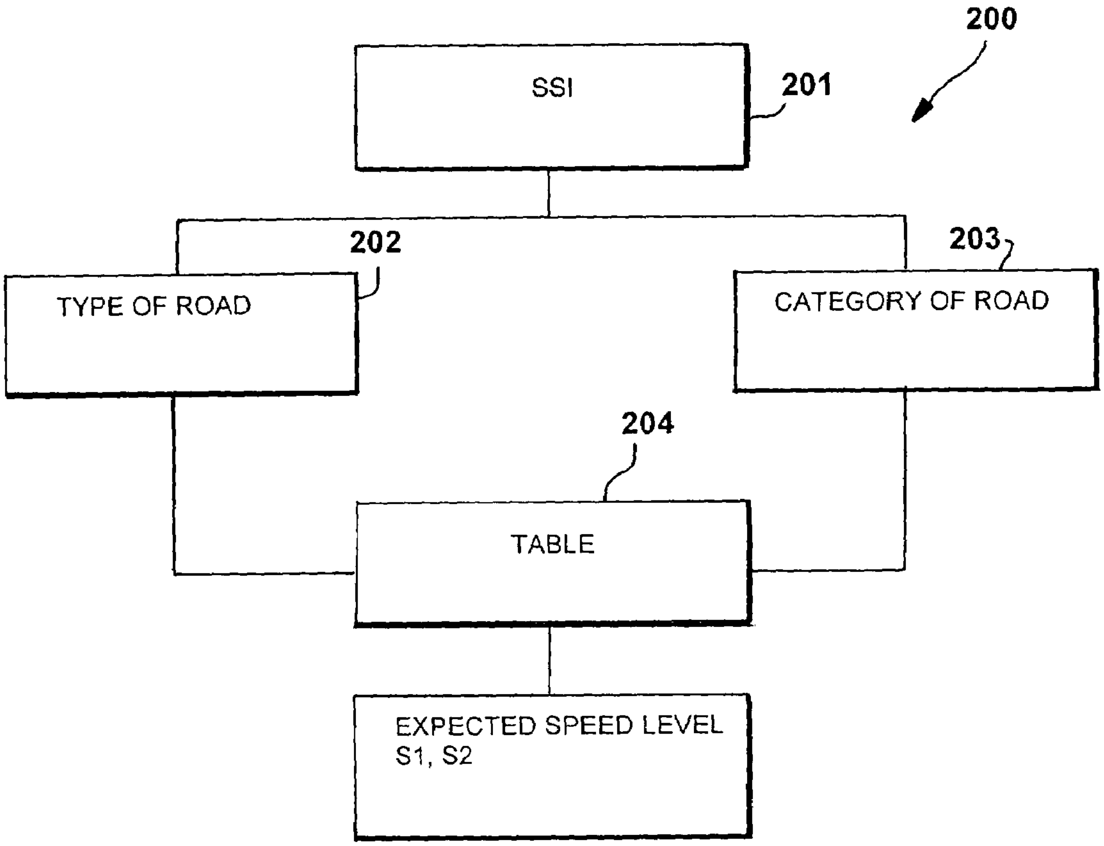
FIG. 2 illustrates a flow chart of a software module for determining the speed level to be expected.

FIG. 2 shows a flow chart for the software module 200 for determination of the anticipated speed level. The known standard sensor interface (SSI) 201 supplies the normal speed (conventional speed in undisturbed traffic flow) for a few roads on the basis of a digital map (not shown here) having this information. For all other roads, the digital map, usually a DVD of the navigation system, carries an index of to which type of road 202 and to which road category 203 the specific road belongs. If the expected normal speed is not available, according to this invention the speed level to be expected for all other roads for undisturbed traffic flow is assigned on the basis of a table 204 with entries for the different "types of roads" and optionally for the different "road categories."

Table 204 has a lower speed threshold S1 and an upper speed threshold S2 (speed level to be expected) for the particular type of road, whereby a distinction is optionally made according to whether the vehicle is moving on this type of road within the inner city or outside of the city (road category). If the vehicle is on a fully developed national highway, the normal speed is in particular approximately 100 km/h, e.g., according to the maximum allowed speed limit. The lower speed threshold S1 is given as 35 km/h in the table and the upper speed threshold S2 is given as 45 km/h in the table. These are empirical values based on the assumptions that a traffic disturbance is to be assumed if the speed is less than 35 km/h, that there could be a traffic disturbance at a speed of 35 to 45 km/h and that there would probably be no traffic disturbance, i.e., no congested traffic, at a speed of more than 45 km/h. Corresponding entries have also been made in the table for the other types of roads.

The normal speed for the specific road may also be given on the digital map. The lower speed threshold S1 may be set at 35% of the normal speed, if necessary, and the upper speed threshold S2 may be set at 45% of the normal speed. The lower speed threshold S1 and the upper speed threshold S2 are thus based on the normal speed.

Table 204 below gives exemplary values:

| Road category according to SS1 | Inner city (S1/S2) [km/h] | Outside of city (S1/S2) [km/h] |
|---|---|---|
| 0 not specified | same as before | same as before |
| 1 highway | — | 46/60 |
| 2 fast road | 15/25 | 35/45 |
| 3 regional road | 15/25 | 30/40 |
| 4 main road | 15/25 | 30/40 |
| 5 local road | 15/25 | 30/40 |
| 6 connecting road | 15/25 | 30/40 |
| 7 slow road | 10/20 | 25/35 |
| 8 minor road | 10/20 | 25/35 |
| 9 service road | 10/20 | 25/35 |

Figure 3:
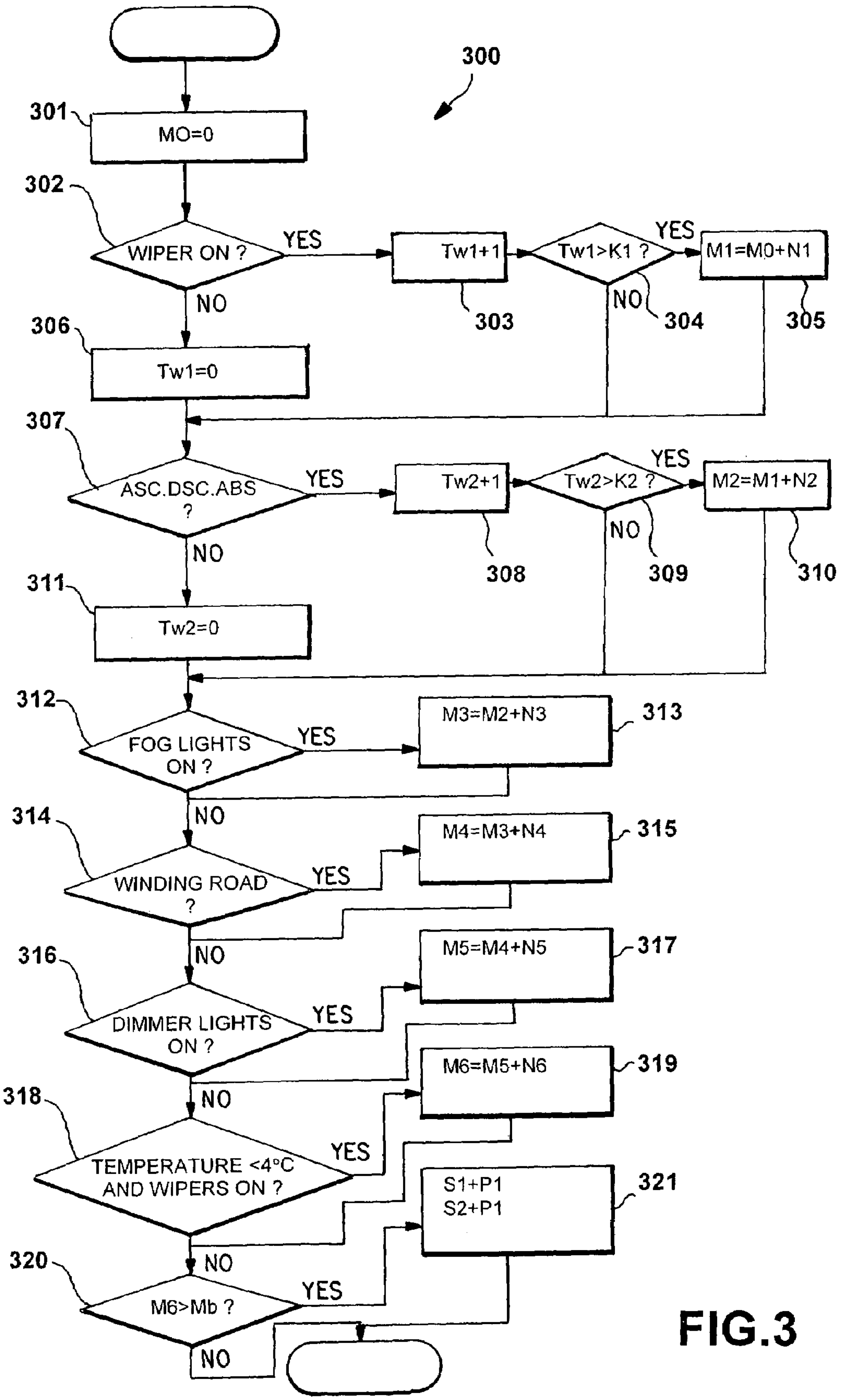
FIG. 3 illustrates a flow chart of a software module for determining the boundary conditions of weather and road layout.

According to FIG. 3, for determination of the boundary conditions of weather and road layout, the speed thresholds S1 and S2 are transmitted to a software module which adjusts the speed threshold values to the boundary conditions, if necessary.

It is self-evident that these values are empirical values which may be selected to optimize the reliability of detection of congested traffic. Likewise the speed thresholds S1 and S2 may also be determined on the basis of the table when the normal speed is listed on the digital map.

A distinction is made in particular among the following under "type of road" in the SSI: freeway or highway or throughway, expanded federal road (highway and/or fast road), not expanded federal road (fast road and/or regional road), main road, local road, connecting road, slow road, minor road and service road. A distinction is made between "inner city" and "outside of city" under "road category" in the SSI.

FIG. 3 shows a flow chart of the software module 300 for determination of the boundary conditions of weather and road layout.

Figure 5A:
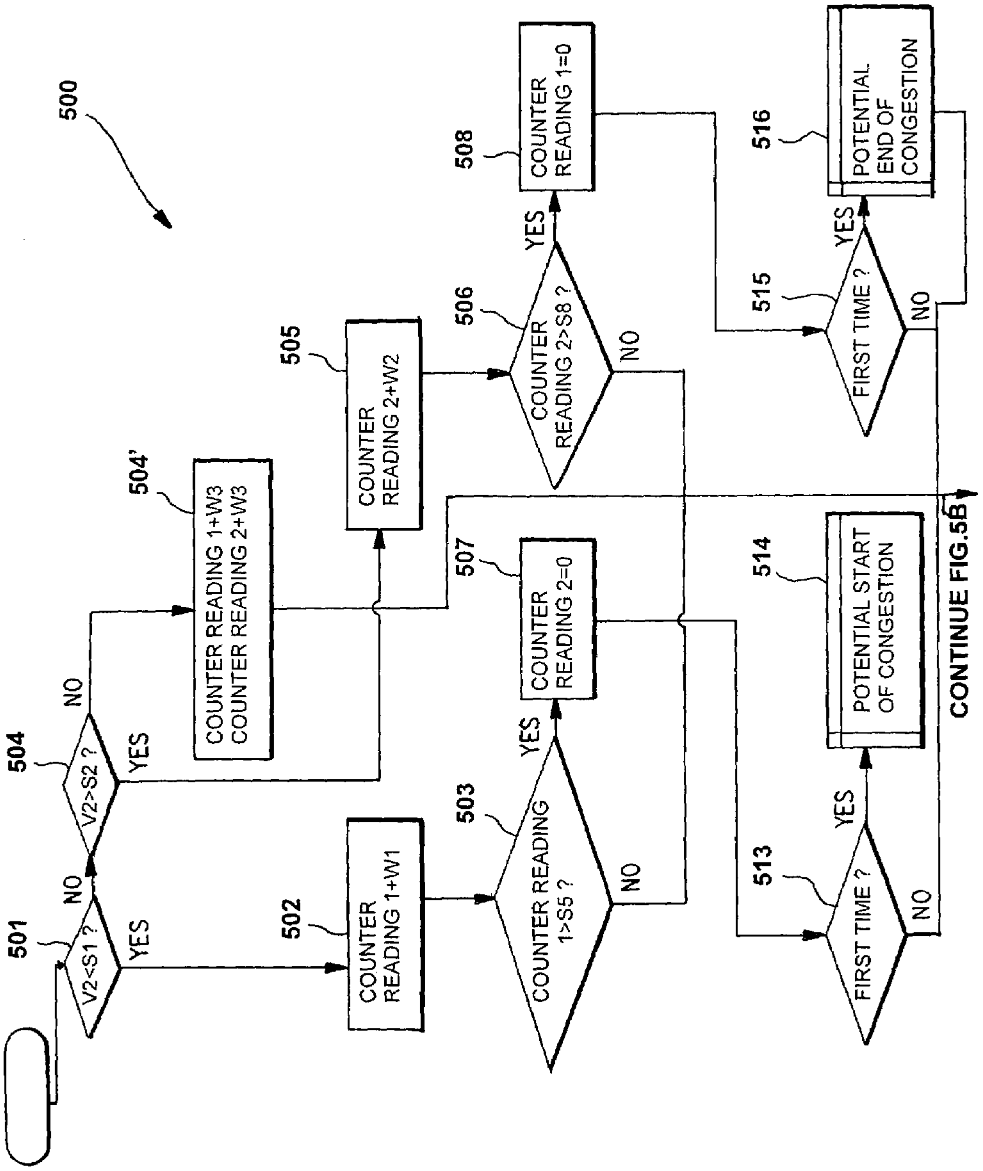
FIGS. 5A and 5B illustrate a flow chart of a software module for detection of the traffic status.
Figure 5B:
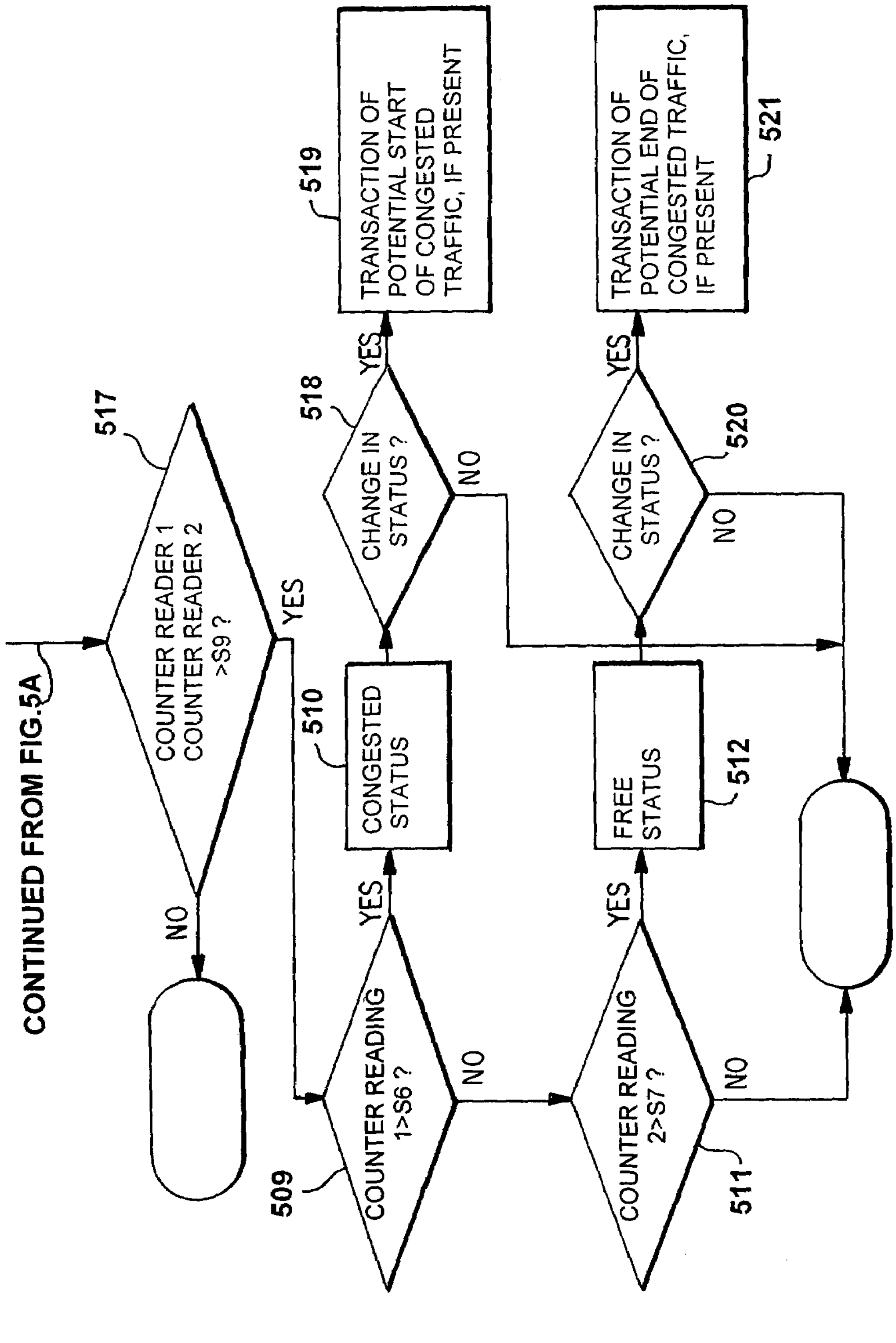

The SSI data:

wiper switch wiper frequency transverse acceleration
ABS
ASC/DSC
steering angle
temperature
lights
fog lights allows an estimation of boundary conditions and environmental conditions such as snowfall, rainfall, slippery roads or winding roads. In the case of a substantial occurrence of one of these boundary conditions, the threshold values S1 and S2 for the traffic status detection described in FIGS. 5A and 5B are adjusted accordingly.

In step 301, the value M, which indicates the severity of the prevailing boundary conditions, is set at "0," i.e., the starting value for M is M0=0. In the second cycle, the sequence depicted in FIG. 3 is run through. In step 302, the comparison determines whether the windshield wiper of the vehicle is on. If the result of this comparison 302 is "yes," a value Tw1 indicating the length of the windshield wiper activity is incremented by the value "1" in step 303. In step 304, the comparison determines whether the current value of Tw1 is greater than a value K1 which indicates a lower time threshold. If the windshield wiper runs for a longer period of time than the lower time threshold K1, i.e., if the result of the comparison 304 is "yes," then the value M0 in step 305 is incremented by the value N1, i.e., M1=M0+N1. N1 is a value expressing the extent of the influence on the normal speed of the vehicle without any negative boundary conditions and thus represents a weight for the condition "windshield wiper on." After adding N1 in step 305, it continues with the following steps.

If the windshield wiper is not on, the comparison 302 yields a "no" and the value Tw1 is set at "0" in step 306. In this case, the process continues with step 307 if the comparison 304 has yielded a "no" or if M1=M0+N1 has been added. If the result in step 302 is "no," the value of Tw1 is reset at "0."

In step 307, the data supplied by the SSI verifies whether ASC, DSC or ABS has intervened. The result of the comparison 307 may optionally be "yes." Since the sequence depicted in FIG. 3 is run through once every second, the value Tw2 is incremented by the value "1" once every second in step 308 if the intervention is ongoing. If the value of Tw2 is greater than a lower time threshold K2, then the result of the comparison 309 is "yes" and in step 310, the value N2 is added to the value M1 from step 305, i.e., M2=M1+N2. N2 is a value expressing the extent of the influence on the normal speed of the vehicle without any negative boundary conditions and thus represents a weight for the condition "ASC, DSC or ABS active." If the result of the comparison 307 is "no," then Tw2 is set at "0" in step 311.

The next step 312 verifies whether the fog lights have been turned on. The result of the comparison 312 may be "yes"; in step 313 the value N3 is added to the value M2 from step 310, i.e., M3=M2+N3. N3 is a value expressing the extent of the influence on the normal speed of the vehicle without any negative boundary conditions and thus represents a weight for the condition "fog," i.e., "fog lights on."

If the result of the comparison in step 312 was "no" or if the value N3 is added in step 313, the step 314 is performed. This step verifies whether the road is a winding road. This can be performed based on the steering angle data supplied by the SSI and the change in same over time. If the result of the comparison 314 is "yes," then in step 315 the value N4 is added to the value M3, i.e., M4=M3+N4. If the result of the comparison 314 is "no" or if step 315 has been performed, it continues with step 316. N4 is a value expressing the extent of the influence on the normal speed of the vehicle without negative boundary conditions and thus represents a weight for the condition "winding road."

Step 316 verifies whether the dimmer lights have been turned on. As an alternative, a daylight sensor could be used to verify whether it is dark and whether the dimmer lights should be turned on. Such a sensor, which automatically turns the dimmer lights on when it is dark, is known as "driving light control" as special equipment. If it is found that the dimmer lights have been turned on or should be turned on because it is dark, then the result of the comparison 316 is "yes" and in step 317 the value N5 is added to the value M4, i.e., M5=M4+N5. N5 is a value expressing the extent of the influence on the normal speed of the vehicle without any negative boundary conditions and thus represents a weight for the condition "darkness," i.e., "dimmer lights on."

If the result of the comparison is "no" and/or if N5 was added in step 317, the sequence continues with step 318. Step 318 verifies whether the temperature is lower than 4° C. and also whether the windshield wiper is turned on. The result of the comparison 318 may be "yes" and in step 319 the value N6 is added to the value M5, i.e., M6=M5+N6. N6 is a value expressing the extent of the influence on the normal speed of the vehicle without any negative boundary conditions and thus represent a weight for the condition "temperature lower than 4° C. and windshield wipers turned on."

If the result of the comparison is "no" and/or if N6 was added in step 319, it continues with step 320.

Step 320 verifies whether the value M6 is greater than a preselected value Mb. Mb is an empirical value and/or is determined by trial runs, for example, and indicates the value beyond which a lower speed is to be expected in comparison with normal speed based on the aforementioned boundary conditions. If the result of the comparison 320 is "yes," the lower speed threshold S1 and the upper speed threshold S2 from the software module 200 for determining the expected speed level are reduced by multiplication times a value P1, which is less than 1. In practice, it has been found that a value P1 of approximately 0.9 is suitable, i.e., that S1 and S2 should be reduced to approximately 90% of their normal value under the aforementioned boundary conditions.

In the next step, the sequence depicted in FIG. 3 is run through again approximately once every second, for example, unless it is found that the vehicle is outside of the scope of the inventive congested traffic detection (see FIG. 1).

These values for S1 and S2, optionally reduced by the aforementioned boundary conditions, represent the values for S1 and S2 in FIGS. 5A and 5B, which illustrate a flow chart of the software module for detection of the traffic status. This prevents adverse boundary conditions, which would result in a reduction in the speed being driven without there being congested traffic, from leading to presumed detection of congested traffic.

Figure 4:
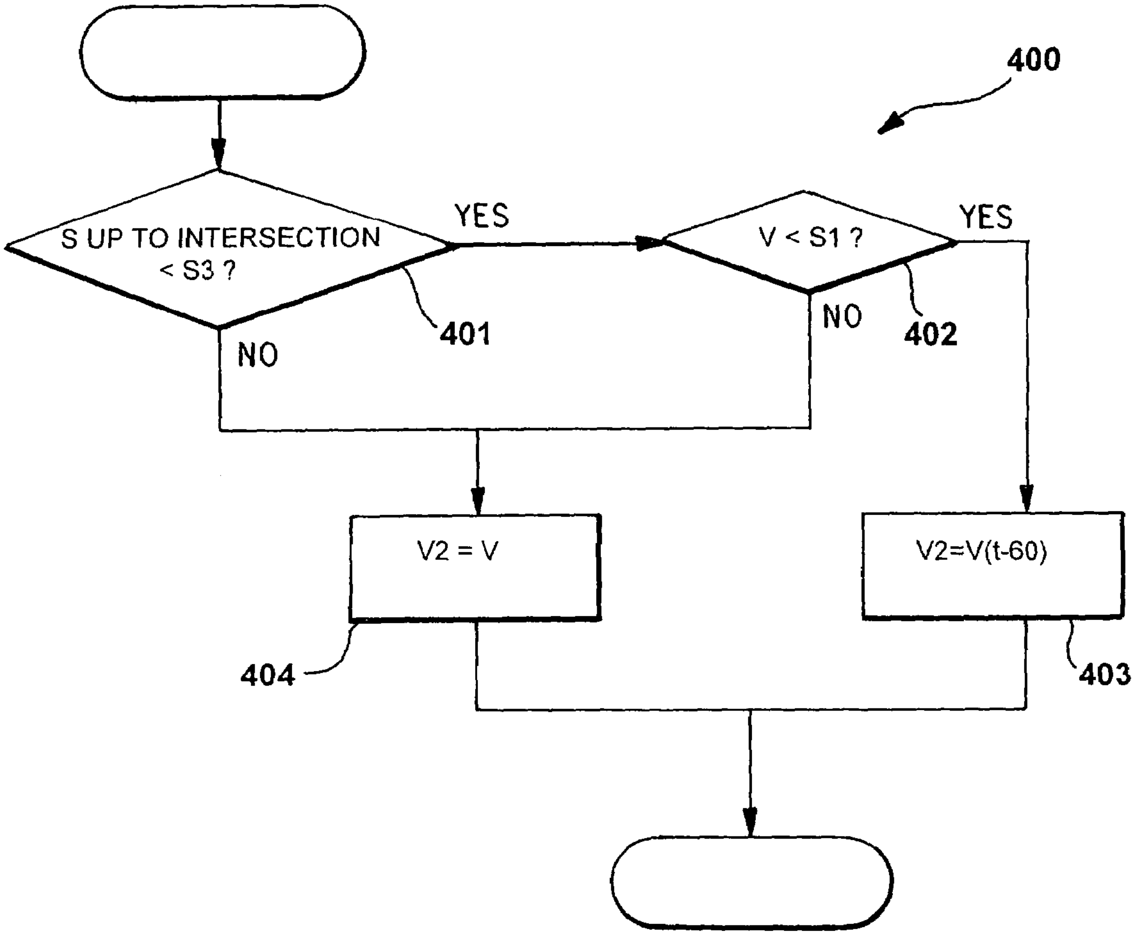
FIG. 4 illustrates a flow chart of a software module for detection of intersection areas.

Furthermore, the similarly reduced value for S1 is used instead of the value S1 in FIG. 4, which illustrates a flow chart of a software module for detection of intersection areas.

Delays in traffic flow caused by intersections both with and without traffic light control, are recognized as such and are filtered out with normal delay and subsequent travel through the intersection. In this way in practical terms a driving profile that is free of intersections is emulated, thus making it possible to detect traffic status even in intersection areas. The SSI data "distance from the nearest intersection" (from the navigation system with digital map) and "speed" are used for this purpose. Congested traffic before an intersection area is identified in the actual traffic status detection (FIGS. 5A and 5B).

Step 401 verifies whether the distance S of the vehicle from the nearest intersection is less than a predetermined distance S3. On the basis of trial runs, a value of approximately 160 meters for S3 currently appears preferable. If the result of the comparison is "yes," then step 402 verifies whether the speed v of the vehicle is less than the lower speed threshold S1 currently in effect. As already stated, this may, if necessary, be the reduced value for S1 (see FIG. 3). If the result of the comparison is "yes," then the actual speed v of the vehicle is not relayed as speed v2 to the traffic status detection in FIGS. 5A and 5B but instead in step 403 the average speed of the vehicle during the last 60 seconds before the comparison in step 402 is used, i.e., v2=v (t−60). This average speed v2 is thus a speed that has been corrected for intersections (modified).

If the result of the comparison 401 is "no," i.e., the vehicle is not driving in the area of an intersection, then the actual speed v of the vehicle is relayed as speed v2 in step 404 to the traffic status detection in FIGS. 5A and 5B.

In the next step, the sequence depicted in FIG. 4 is run through again approximately once every second, for example, unless it is found that the vehicle is outside of the scope of the inventive congested traffic detection (see FIG. 1).

Finally, FIGS. 5A and 5B illustrate a flow chart of a software module 500 for detection of the traffic status by means of a threshold value method, i.e., for determining whether there is congested traffic or whether drivers can drive freely. Furthermore, the inventive software module 500 allows the determination of position information for the start of the congested traffic and position information for the end of the congested traffic.

Following steps 111 (PAUSE detection), 112 (RESET detection) or 113 (GO detection), a verification is performed to determine whether there is "PAUSE detection." If the result is "no," the method steps depicted in FIGS. 5A and 5B are run through without any change in the counter readings of the counters described below. If the result is "yes," a verification is performed to ascertain whether there is also "RESET detection." If there is "RESET detection," i.e., if the result of this comparison is "yes," then the counter readings of the two counters described below are each reset at the counter reading "0" and the method steps of FIGS. 5A and 5B are then continued with the counter readings "0." If there is a "RESET detection," then the method steps of FIGS. 5A and 5B are continued after the pause (PAUSE detection) with the counter readings given at that point in time.

In summary, the basic data for the threshold value method performed by software module 500 is the data determined by the four software modules described above and the current speed data of the vehicle. If software module 100 (range of validity) determines that the vehicle is not participating in flowing traffic, then the traffic status detection according to FIGS. 5A and 5B is suppressed. After participation in traffic has been ascertained, the module data is used for modification of the speed values v2 and for determination of the current threshold values S1 and S2. The speed data is modified on the basis of the boundary conditions of weather, road condition and road layout (intersections, winding roads) that have been determined. The modified speed data is used for the further calculations. The threshold values are determined via the setpoint speed (software module 200). They divide the entire speed range into three parts: speed v less than S1, v between S1 and S2 and v greater than S2. The modified speed data may be assigned to one of the three ranges every second. The currently prevailing traffic states are then determined on the basis of the frequencies of the modified speed data in the individual areas. Traffic light areas and intersection areas have already been taken into account through the modification of the speed data. Congested traffic is recognized just as accurately in the areas of traffic lights or intersections as in areas without intersections.

The first step 501 of the flow chart of the software module 500 verifies whether the speed v2 (optionally a speed corrected for intersections according to FIG. 4) is less than the lower speed threshold S1 (optionally modified by the boundary conditions of weather, road condition and road layout). If the result of the comparison 501 is "yes," which is considered an indication of congested traffic, then in step 502, starting from counter reading "0," the value is incremented by the value W1 by the first counter (counter reading 1+W1). The first counter thus takes into account a low speed v2<S1 of the vehicle. Since the flow chart is run through every second, the counter is incremented every second if the result of the comparison remains the same. If necessary, the counter reading in step 502 may be incremented by the value "1" every second, i.e., W1=1. Of course another value such as "0.5, " could also be added. The reading on the counter in step 502 is compared in step 503 with a value S5 (counter reading 1>S5).

If the result of the comparison 501 is "no," i.e., if v2 is not less than the lower speed threshold S1, then step 504 verifies whether the speed (optionally modified) of the vehicle v2 is greater than the upper speed threshold S2. If the result of the comparison 504 is "yes," which is considered an indication of driving freely, i.e., no congested traffic, then in step 505, starting at counter reading "0, " the counter is incremented by the value W2 by a second counter (counter reading 2+W2). The second counter thus takes into account a high speed v2>S2 of the vehicle. Since the flow chart is run through once every second, if the result of the comparison remains the same, the counter is incremented every second. The counter reading on the second counter is optionally incremented by the value "1" once every second in step 505, i.e., W2 is "1." Of course, another value such as "0.5" could also be added. The reading on the second counter in step 505 is then compared with the value S8 in step 506. If the result is "yes" the counter reading on the second counter is reset at "0" in step 508. If the result is "no," it continues with step 517.

Starting from the comparison 501, the first counter is thus incremented when there is congested traffic in step 502. The counter reading on the first counter optionally exceeds the value S5 and the result of the comparison 503 is "yes." Then in step 507, the second counter, which counts how many seconds of driving freely there have been, is reset at "0" (counter reading 2=0). Starting from the comparison 504, when vehicles are driving freely, the second counter is incremented in step 505 (counter reading 2+W2). The counter reading on the second counter may exceed the value S8 and the result of the comparison 506 is then "yes." Then in step 508, the first counter, which counts how many seconds the congested traffic has lasted, is reset at "0" (counter reading 1=0).

Step 513 verifies whether the counter reading on the second counter (counter reading 2) has been reset at "0" for the first time in step 507. If the result is "yes," then in step 514, the time and place of the first time the counter reading on counter 1 was greater than the value S5 in step 503 is saved (potential start of congested traffic). This is a potential value, because one must still show in step 509 whether there is actually any congested traffic. Step 515 verifies whether the counter reading on the first counter (counter reading 1) has been reset at "0" for the first time in step 508. If the result is "yes," then in step 516 the time and place when the counter reading on the counter 2 in step 506 was greater than the value S8 for the first time is saved (potential end of congested traffic). This is a potential result because in step 511 it will still be necessary to determine whether there is actually no congested traffic.

After steps 513, 514, 515 and 516, step 517 verifies whether the absolute value of the difference between counter reading 1 and counter reading 2 is greater than a value S9 (|counter reading 1−counter reading 2|>S9). If the result of the comparison is "yes," then step 509 is performed. If the result of the comparison is "no," then step 509 is not performed and the process sequence depicted in FIGS. 5A and 5B begins again with step 501, as in the run-through, which may be occurring again once every second.

If the speed v2 is between S1 and S2, the result of the comparison in step 504 is "no." This situation is considered an indefinite state, i.e., it is not clear whether or not there is congested traffic or if vehicles can drive freely.

If the counter reading on the first counter is equal to S5 or less than S5, then the result of the comparison 503 is "no." In step 504' the counter reading on the first counter is then incremented by the value W3 and the counter reading on the second counter is also incremented by the value W3, optionally once every second, if the sequence depicted in FIGS. 5A and 5B is run through once every second. W1 and W2 may have the same value, with W3 amounting to half the value of W1 and/or W2. The value of W1 and/or W2 may be "1" and the value of W3 may be "0.5." It is self-evident that another weighting may also be used if it results in a more reliable detection of congested traffic.

The counter reading on the first counter (low speed) is compared with the value S6 once every second in step 509 (counter reading 1>S6). If the counter reading on the first counter is greater than S6, the result of the comparison is "yes," so in step 510 a first data record is generated, describing the "congested traffic" condition. Step 518 verifies whether there has been a change in status, i.e., whether the "driving freely" status preceded the "congested traffic" status. With each restart of the vehicle, the "driving freely" status is defined as a starting state. If the result of the comparison is "yes," then the first data record and the place and time of the start of the congested traffic (formerly only a potential start) are transmitted in step 519 to an institution that reconstructs and reports the traffic situation for the purpose of data acquisition, in particular a central traffic information office, which may be a regional central traffic information office, via SMS.

If the counter reading on the first counter is less than or equal to a value S6, then the result of the comparison is "no." Step 511 optionally verifies whether the counter reading on the second counter is greater than a value S7. If the result of the comparison is "yes," then in step 512, a second data record is generated, describing the "driving freely" status. Step 520 verifies whether there has been a change in status, i.e., whether the "congested traffic" status preceded the "driving freely" status. If the result of this comparison is "yes," the second data record and the time and place of the end of the congested traffic (formerly only potential) in step 521 are transmitted, which may be by SMS, to an institution that reconstructs and reports the traffic situation for the purpose of data acquisition, in particular a central traffic information office, e.g., a regional central traffic information office.

If the result of the comparisons in steps 518 or 520 is "no," there is no data transmission. Instead, the method described in FIGS. 5A and 5B begins again with step 501.

If the counter reading on the first counter (beginning of congested traffic) in step 509 is less than or equal to S6, then the result of the comparison 509 is "no." Then the next step 511 verifies whether the counter reading on the second counter (end of congested traffic or driving freely) is greater than or equal to S7. If the counter reading on the second counter is greater than or equal to S7, then the result of the comparison is "yes" and the "driving freely" status may be transmitted again in step 512 to the institution that reconstructs and reports the traffic situation, again via SMS, for the purpose of detection of the traffic situation.

After output of the "congested traffic" status or "driving freely" status or when the comparison 511 is "no," the sequence depicted in FIGS. 5A and 5B is run through again.

To determine the location of the start of the congested traffic and be able to transmit it to the institution that reconstructs and reports the traffic situation (not shown), then following the resetting of the second counter in step 507, step 513 verifies whether it is the first run-through or whether this comparison 513 is being performed for the first time. If the second counter in step 507 was reset at "0" for the first time, the result of the comparison 513 is "yes" and the position of the vehicle at this point in time determined on the basis of the navigation system data is saved as "start of congested traffic" in step 514. In the determination of the "congested traffic" state in step 510, the position of the vehicle, which is also stored in step 514, i.e., the "start of congested traffic," may be transmitted to the institution that reconstructs and reports the traffic situation, via SMS.

To also ascertain the location of the end of the congested traffic and be able to transmit this information to the institution that reconstructs and reports the traffic situation (not shown here), then following the resetting of the first counter in step 508, step 515 verifies whether this is the first run-through, i.e., whether this comparison 515 is being performed for the first time. If the first counter was reset at "0" for the first time in step 508, the result of the comparison 515 is "yes" and the position of the vehicle at this point in time determined on the basis of the navigation system data is saved as "end of congested traffic" in step 516. In the determination of the "driving freely" state in step 512, the position of the vehicle saved in step 516, i.e., the "end of congested traffic," may be transmitted to the institution that reconstructs and reports the traffic situation, via SMS.

If the result of the comparison 513 or 515 is "no" or if the "start of the congested traffic" was saved in step 514 or the end of the congested traffic was saved in step 516, then the sequence continues with the comparison in step 509.

A value of approximately 60 seconds, for example, may be selected for S5, and a value of approximately 180 seconds, for example, may be selected for S6 and S7. It is self-evident that other values than these practical values may also be selected if they permit a more reliable detection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for providing traffic status information as part of a traffic status detection by a traffic status detection device provided in a motor vehicle, for ascertaining the traffic situation, including detecting traffic congestion, the method comprising the acts of:

detecting a traffic status repeatedly by the traffic status detection device, detecting a change in traffic status by the traffic status detection device, generating a data record describing the change in traffic status by the traffic status detection device, which comprises a program-controlled computer, and transmitting the data record by the traffic status detection device to a receiver that receives the data record via Short Message Service, wherein the data record indicates whether a change in traffic status from the traffic status of "congested traffic" to the traffic status of "driving freely" or a change in traffic status from the traffic status of "driving freely" to the traffic status of "congested traffic" has been detected by the traffic status detection device provided in the motor vehicle.

2. Method as claimed in claim 1 wherein, in determination of the traffic statuses of "congestion" or "driving freely," a check is performed several times to ascertain whether the relevant speed of the vehicle is less than a lower speed threshold and greater than an upper speed threshold.

3. Method as claimed in claim 2, wherein the check is performed periodically and the traffic status of "congestion" or "driving freely"that has occurred first largely without interruption with a predetermined frequency is considered as a prevailing state.

4. Method as claimed in claim 3, wherein the data record describing the change in traffic status additionally indicates a location and a point in time of the change in traffic status, including a place and point in time of a start of the congestion or an end of the congestion.

5. Method as claimed in claim 3, wherein after transmission of the data record of the change in traffic status after a predetermined interval of time or distance, a data record describing the traffic status, including congested traffic, is transmitted by the vehicle, indicating the average speed in the congested traffic or the frequency of stopping in the most recent interval.

6. Method as claimed in claim 2, wherein the data record describing the change in traffic status additionally indicates a location and a point in time of the change in traffic status, including a place and point in time of a start of the congestion or an end of the congestion.

7. Method as claimed in claim 2, wherein after transmission of the data record of the change in traffic status after a predetermined interval of time or distance, a data record describing the traffic status, including congested traffic, is transmitted by the vehicle, indicating the average speed in the congested traffic or the frequency of stopping in the most recent interval.

8. Method as claimed in claim 1, wherein the data record describing the change in traffic status additionally indicates a location and a point in time of the change in traffic status, including a place and point in time of a start of the congestion or an end of the congestion.

9. Method as claimed in claim 8, wherein after transmission of the data record of the change in traffic status after a predetermined interval of time or distance, a data record describing the traffic status, including congested traffic, is transmitted by the vehicle, indicating the average speed in the congested traffic or the frequency of stopping in the most recent interval.

10. Method as claimed in claim 1, wherein after transmission of the data record of the change in traffic status after a predetermined interval of time or distance, a data record describing the traffic status, including congested traffic, is transmitted by the vehicle, indicating the average speed in the congested traffic or the frequency of stopping in the most recent interval.

11. Method as claimed in claim 1, wherein the receiver is a central traffic information office, which provides information about the traffic situation using the data record.

12. Method as claimed in claim 1, wherein the traffic situation is made available using the data record and additional traffic status information from local measurement sites including at least one of induction loops, bridge sensors, camera systems, signal lights and mobile measurement sites, including at least one of reporting vehicles, traffic reporters and police reports.

13. Method as claimed in claim 1, wherein the receiver is at least one other vehicle which analyzes the data record to support the driver or relays the data record to other vehicles or to central traffic information offices by way of data collection points via a wireless interface to a transmission network.

14. Method as claimed in claim 1, wherein, in determination of the traffic statuses of "congestion" or "driving freely," a check is performed several times to ascertain whether the relevant speed of the vehicle is less than a lower speed threshold and greater than an upper speed threshold.

15. Method as claimed in claim 1, wherein after transmission of the data record of the change in traffic status after a predetermined interval of time or distance, a data record describing the traffic status, including congested traffic, is transmitted by the vehicle, indicating the average speed in the congested traffic or the frequency of stopping in the most recent interval.

16. System for transmitting traffic status data from a first vehicle to a second vehicle, in modified form, via an ad hoc network or from a central traffic information office to one or more vehicles, by broadcast, the system comprising:

a receiver in the second vehicle for receiving the traffic status data; and a traffic status detection device configured to repeatedly detect traffic status, detect a change in traffic status, generate a data record describing the change in traffic status, and transmit the data record to the receiver, wherein the data record indicates whether a change in traffic status from the traffic status of "congested traffic" to the traffic status of "driving freely" or a change in traffic status from the traffic status of "driving freely" to the traffic status of "congested traffic" has been detected by the traffic status detection device provided in the motor vehicle.

17. Device in a motor vehicle for generating and sending traffic status information, wherein the device is configured to repeatedly detect traffic status, detect a change in traffic status, generate a data record describing the change in traffic status, and transmit the data record to a receiver.

wherein the data record indicates whether a change in traffic status from the traffic status of "congested traffic" to the traffic status of "driving freely" or a change in traffic status from the traffic status of "driving freely" to the traffic status of "congested traffic" has been detected by the traffic status detection device provided in the motor vehicle.

18. Computer program product including a computer-readable medium encoded with a computer program for use in a motor vehicle for generating and sending traffic status information, the computer program comprising instructions for:

detecting a traffic status repeatedly by a traffic status detection device, detecting a change in traffic status by the traffic status detection device, generating a data record describing the change in traffic status by the traffic status detection device, which comprises a program-controlled computer, and transmitting the data record by the traffic status detection device to a receiver that receives the data record via Short Message Service, wherein the data record indicates whether a change in traffic status from the traffic status of "congested traffic" to the traffic status of "driving freely" or a change in traffic status from the traffic status of "driving freely" to the traffic status of "congested traffic" has been detected by the traffic status detection device provided in the motor vehicle.

* * * * *